United States Patent
Belvin et al.

(10) Patent No.: US 6,514,370 B1
(45) Date of Patent: Feb. 4, 2003

(54) DRY PROCESS FOR MANUFACTURING HYBRIDIZED BORON FIBER/CARBON FIBER THERMOPLASTIC COMPOSITE MATERIALS FROM A SOLUTION COATED PRECURSOR

(75) Inventors: Harry L Belvin, Hayes, VA (US); Roberto J. Cano, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 79 days.

(21) Appl. No.: 09/591,384

(22) Filed: Jun. 8, 2000

(51) Int. Cl.[7] .............................. D04H 3/08; B32B 31/00
(52) U.S. Cl. ...................... 156/181; 156/166; 156/180; 156/307.3; 156/307.7; 427/374.4; 427/398.1; 427/385.5
(58) Field of Search ................................ 156/166, 180, 156/181, 301, 307.3, 307.7; 427/185, 195, 346, 375, 386, 384, 389.8, 389.9, 374.4, 398.1, 385.5; 118/57

(56) References Cited

U.S. PATENT DOCUMENTS

| | | |
|---|---|---|
| 2,702,408 A | 2/1955 | Hartland |
| 4,680,224 A | 7/1987 | O'Connor |
| 4,883,552 A | 11/1989 | O'Connor |
| 5,296,064 A | 3/1994 | Muzzy et al. |
| 5,395,477 A | 3/1995 | Sandusky |
| 5,405,683 A | 4/1995 | Sandusky et al. |
| 5,409,757 A | 4/1995 | Muzzy et al. |
| 5,618,367 A * | 4/1997 | Wilkinson et al. .......... 156/181 |

OTHER PUBLICATIONS

Belvin et al, "Carbon–Boron Reinforced Dry Polymer Matrix Composite Tape", 31st SAMPE Technical Conference, Oct. 1999.*

H. L. Belvin et al, "Fabrication of composite tape from thermoplastic powder–impregnated tows"; *29th International SAMPE Technical Conference,* vol. 28, Sep. 1996, pp. 1309–1316.

* cited by examiner

*Primary Examiner*—Cynthia H. Kelly
*Assistant Examiner*—J. M. Gray
(74) *Attorney, Agent, or Firm*—Kurt G. Hammerle (57) ABSTRACT

An apparatus for producing a hybrid boron reinforced polymer matrix composite from precursor tape and a linear array of boron fibers. The boron fibers are applied onto the precursor tapes and the precursor tape processed within a processing component having an impregnation bar assembly. After passing through variable-dimension forming nip-rollers, the precursor tape with the boron fibers becomes a hybrid boron reinforced polymer matrix composite. A driving mechanism is used to pulled the precursor tape through the method and a take-up spool is used to collect the formed hybrid boron reinforced polymer matrix composite.

8 Claims, 5 Drawing Sheets

DRY PROCESS FOR MANUFACTURING HYBRIDIZED BORON FIBER/CARBON FIBER THERMOPLASTIC COMPOSITE MATERIALS FROM A SOLUTION COATED PRECURSOR

CROSS REFERENCE TO RELATED APPLICATION

This application is related to commonly owned, co-pending patent application Ser. No. 09/346,464, filed Jul. 1, 1999 now abandoned.

ORIGIN OF INVENTION

This invention described herein was made by employees of the United States Government and may be manufactured and used by or for the Government or government purposes without payment of any royalties thereon or therefor.

BACKGROUND OF THE INVENTION

1. Field of the Invention

This invention relates generally to the preparation and fabrication of prepreg tapes and ribbons and relates specifically to the preparation of polyimide resin/carbon fiber/boron fiber unidirectional solvent-free tape and ribbon having well wet-out and encapsulated boron fiber evenly distributed throughout the tape or ribbon, controlled dimensions and resin content, and composite structures having high mechanical properties.

2. Description of the Related Art

Reinforcing fibers comprising filaments combined with a matrix resin are known in the art and typically are called "towpregs." A conventional towpreg consists of thousands of filaments impregnated with a continuous mass of matrix. The type of advanced reinforcing fibers typically used are available commercially in bundles of filaments known as "tows." The number of filaments vary widely per tow and is denoted by the tow count. Many matrix resins are available that generally fall into one of two resin types within the related art: thermoplastic and thermoset polymers.

Thermoplastic polymers have been used widely as matrices for composites, and are potentially useful as matrices for advanced composites in aerospace applications. Thermoplastics have advantages over thermosetting materials in fracture toughness, impact strength, and environmental resistance. Thermoplastics also provide towpregs with indefinite shelf life, give the fabricator better quality assurance, and avoid the storage and refrigeration problems associated with thermosetting towpreg. Thermoplastic molecules are tougher than the rigid crosslinked network of the thermosets; few of the toughened thermosets have met the combined requirements of damage tolerance and hot/wet compression strength necessary for use in aerospace composites. The disadvantage of thermoplastic polymers as a composite matrix material is the difficulty of uniformly coating the fibers due to the high viscosity of the molten polymer.

Thermoset polymers also are used as matrices for towpreg. Typically, towpreg containing thermosetting prepolymer, although relatively flexible, is tacky, thus requiring a protective release coating, which must be removed before use. While thermoset towpreg is acceptable for filament winding, its tackiness and the requirement of a protective release coating make thermoset towpreg unfeasible for weaving, braiding, or the production of any chopped fiber feed stock for bulk or sheet molding compounds.

Continuous fiber towpregs can be produced by a number of impregnation methods including hot melt, solution, emulsion, slurry, surface polymerization, fiber commingling, film interleaving, electroplating, and dry powder techniques. A powder impregnation method and apparatus are disclosed in U.S. patent application Ser. No. 09/185142, filed Nov. 3, 1998, entitled Method and Apparatus to Fabricate a Fully-consolidated Fiber-Reinforced Tape from Polymer Powder Preimpregnated Fiber Tow Bundles for Automated Tow Placement (Belvin et al.), now abandoned the disclosure of which is herein incorporated by reference. U.S. patent application Ser. No. 09/185142 discloses the manufacture of a 3-inch wide product from powder pre-impregnated fiber-tow bundles that employ a number of techniques that are very specific to the fabrication of a placeable-grade 3-inch wide product using powder prepreg fiber-tow bundles as the precursor.

Precursor fabrication is completed in various techniques, such as the Powder Curtain Process (PCP) and other slurry operations. In the PCP, the resin powder is mechanically deposited onto the fiber tow bundles while being pulled through a series of process components. The use of a powder for the impregnation of fiber tow bundles creates a number of obstacles the tape manufacturer has to overcome for the fabrication of a placement grade product.

The PCP can use a powder having a particle size ranging from 3 microns to 15 microns. The particle size is important in the tape fabrication process due to the melt viscosity of the resin. The melt resembles a droplet on the tow bundle and may not completely wet-out (encapsulate) the filaments in the tows. During periods when the resin does not wet-out (encapsulate) the filaments of the tows, the shape of the tape/ribbon becomes irregular and jagged which facilitates the generation of voids. The lack of a smooth uniform surface and a large void content inhibits the placement process during the fabrication of a component.

In any of the mentioned techniques (PCP, Slurry) of powder impregnation, the main concern of the tape manufacturer is the resin content along the length of the tows. If the resin content varies to a large extent, dry areas will exist through-out the tape, and/or an over abundance of resin will be localized in one area. With dry areas, voids manifest themselves during the fabrication of the tape and are magnified during the placement process, creating a product that does not perform as predicted in operation. If the resin content is high in a localized area, the mechanical properties become more dependent on the resin than is typical for that area. A highly consistent resin application and distribution along the length of the fiber tow bundles generates a well consolidated tape product, allowing the automated tape placement machine to fabricate a low void, well consolidated part.

The significant advantages of the solution-coating method include ensuring a virtually even distribution of a coating on the towpregs and the elimination of voids during the tape fabrication and tow placement processes. The ultimate goal for almost all solution-coating applications is the ability to deposit a thin, even thickness, high quality coating as efficiently as possible. The polymeric matrix or resin also must be soluble at ambient and refrigeration storage temperatures.

Typically, towpregs made from solution-coated fiber bundles are not universally well-characterized geometrically, leading to difficulties in using such towpregs for processes when an accurate geometry is vital for the production of high-quality parts. Examples of processes which require an accurate geometry include filament winding, pultrusion, and automated tow placement, or ATP.

ATP is a process where composite ribbons or tapes are robotically managed and continually fed onto a tool or part surface and adhered by application of heat and pressure. ATP is particularly sensitive to the quality of the ribbon when considering low-flow matrix materials. The simultaneous assembly of adjacent ribbons (typically 4 to 34) or wide tape offers significant advances in the lay-up of composite materials. However, ribbons or tapes made from low-flow matrix materials typically lack a cross-sectional dimensional integrity, and more importantly, a standard rectangular cross-section. These structural defects complicate the ATP process and frequently render poor results. Although ribbons are bonded to their vertical neighbor (directly below) satisfactorily, the failure to make quality parts is generally attributed to the poor bonding of adjacent ribbons to each other. Low-flow thermoplastic parts made by using slit prepreg tapes are typically unconsolidated and exhibit excessive porosity and void content.

Ideally, tapes used in the ATP process are fully consolidated. Consolidation can be defined as the elimination of voids in a composite material during melt-processing. One method of accomplishing consolidation is pultrusion. This technique requires full ingestion of the unconsolidated composite material within an enclosed die with an exit area less than the inlet area. Within the heated closed die, processing of the polymeric matrix forces the polymer melt to flow axially to the filament array, whereas flow transverse to the filament array is generally 1/10 to 1/100 of the axial flow. As a consequence of the geometry and boundary limits of the pultrusion die, voids must be expelled axially, against the flow of the composite material through the entrance of the pultrusion die. This complex flow of voids is known to limit the rates at which pultrusion may proceed. With the desirable prepreg attribute of low void content, the pultrusion process is limited in the length of the die because the longer the die, the longer the voids must travel to be fully expelled. This length contributes to a very slow production rate.

High performance polyimides are used in the aerospace industry, for example, in joining metals to metals, or metals to composite structures. In addition, polyimides are rapidly finding new uses as matrix resins for composites, molding powders and films. These materials display a number of performance characteristics such as high temperature and solvent resistance, improved flow for better wetting and bonding, high modulus, chemical and hot water resistance, and the like. Another area of application is in the manufacture of lighter and stronger aircraft and space structures.

U.S. Pat. No. 5,147,966 (St. Clair, et al.) discloses polyimides that can be melt processed into various useful forms as coating, adhesives, composite matrix resins and films. These polyimides are prepared from various dianilines and anhydrides in various solvents. The use of anhydrides as endcapping agents are also disclosed to control the molecular weight of the polymer and, in turn, to make it easier to process in molten form.

Current technology for making prepreg and composites from polyimides as described above utilized solutions from the poly(amide) acids of these resins. Poly(amide) acid solutions are processed into prepreg with various reinforcing fibers. These poly(amide) acid solutions are of low solids contents and high viscosity. In general, poly(amide) solutions are prepared at solid contents of 25 to 35% by weight with resulting Brookefield viscosities at 20° C. of 15,000 to 35,000 cp. Therefore, the processing of these types of solutions requires overcoming significant problems such as solvent management and good fiber wet out from the high viscosity solutions. The resultant prepreg typically requires residual solvent contents of 20 to 25% by weight (approximately 2–3% water from thermal imidization reaction) for adequate tack and drape. This residual solvent must then be removed during the composite cure cycle. This material is hand-laid into composites which makes working with this type of material very labor intensive and costly.

Typically, carbon fiber composites can provide excellent mechanical properties. However, in certain applications carbon fiber alone does not provide adequate compression properties. A solution to this problem is the hybridization of carbon fiber composites with boron reinforcing fibers. Current technology for making boron/carbon prepreg and composites from polyimides utilizes solution coated prepreg with residual solvent. Boron fibers are calendered onto "wet" prepreg to make a hybrid boron/carbon fiber prepreg. This technique only pushes the large diameter boron fibers partially into the "wet" prepreg. The resultant prepreg contains boron fibers that are essentially sitting on the prepreg surface, not fully encapsulated with resin. This material also requires solvent removal during cure as well as being labor intensive.

The need to process high temperature polyimides into composites with minimal solvent is apparent. The hazards and expense of solvent removal and recovery are critical to this composite technology. Developing a dry hybrid polyimide tape allows for automated tape placement by a robot. This can significantly reduce the cost of processing these materials into composite parts and improve their compressive properties. A process which utilizes significantly less, or no, solvent and results in a higher quality intermediary and end product is key to the use of these polyimide systems in large quantities.

SUMMARY OF THE INVENTION

Accordingly, an object of the present invention is to manufacture a boron reinforced polymer matrix composite.

Another object is to manufacture a composite tape of essentially consistent thickness across its width.

A further object of the invention is to manufacture a composite tape suitable for automated tow placement.

Another object of the invention is to manufacture a fully-consolidated composite tape with minimal voids therein.

Still another object of the present invention is to manufacture a composite tape having geometric accuracy.

These objects are accomplished by the present invention that includes a method of manufacturing a hybrid boron reinforced polymer matrix composite comprising the steps of feeding solution-coated precursor tape through an alignment device to align the precursor tape laterally, wherein the solution-coated precursor tape comprise a resin content of from about 50 wt % or less; applying at least one linear array of boron fibers along the length of the solution-coated precursor tape; heating the precursor tape and applied boron fibers to a specific processing temperature which processes the polymeric matrix of the precursor tape; encapsulating the boron fibers between two layers of heated precursor tape forming a hybrid boron reinforced polymer matrix composition; cooling the hybrid boron reinforced polymer matrix composition to a temperature below the $T_g$ of the hybrid boron reinforced polymer matrix composition forming a composite; and taking-up the hybrid boron reinforced polymer matrix composition composite.

The present invention further includes a hybrid boron reinforced polymer matrix composite produced from the process comprising the steps of providing solution-coated precursor tape, wherein the solution-coated precursor tape comprises a polyamic acid solution; applying at least one linear array of boron fibers along the length of the solution-coated precursor tape; heating the precursor tape and applied boron fibers to a specific processing temperature which processes the polymeric matrix of the precursor tape; and encapsulating a boron component into the solution NASA coated precursor tape, wherein a boron reinforced polymer matrix composition is formed.

Additionally, the present invention includes an apparatus for producing a hybrid boron reinforced polymer matrix composite, comprising a dispensing means for supplying at least one linear array of boron fibers; an applying means for positioning solution-coated precursor tape along a length of the dispensed linear array of the boron fibers; a processing component for heating the positioned precursor tape and linear array of the boron fibers to a specific processing temperature which processes the polymeric matrix of the precursor tape and encapsulates the boron fibers into the precursor tape, the processing component having an entrance and an exit, the processing component including an impregnation bar assembly positioned near the exit of the processing component for wetting-out and spreading the heated precursor tape with boron fibers to an initial width; a variable dimension forming nip means, positioned in operable relationship to the processing component, for shaping the heated precursor tape into a predetermined width, the variable dimension forming nip means having at least two rollers that are actively cooled, the rollers being forced together under a selected pressure, wherein the hybrid boron reinforced polymer matrix composition is formed; a driving means, positioned in operable relationship to the variable-dimension forming nip means, for pulling the shaped hybrid boron reinforced polymer matrix composition and maintaining a constant speed across the width of the hybrid boron reinforced polymer matrix composition, thereby enabling the polymeric matrix of the hybrid boron reinforced polymer matrix composition to consolidate fully into the boron reinforced polymer matrix composition; and a take-up component for taking-up the boron reinforced polymer matrix composition, wherein the final tape has less than about 2% voids. The method for manufacturing the composite tape can begin with the solution-coated precursor tape being mounted onto the pay-out creel for delivery. The precursor tape is tensioned at this point to facilitate alignment of the precursor tape within an apparatus. This tension also aids in the spreading of the precursor tape in the processing component. The precursor tape can then be fed through the aligning device to maintain the alignment of the precursor tape during processing. The aligning device facilitates the consistent thickness across the width of the processed material. If the alignment changes, a tape or ribbon will be fabricated of irregular shape unsuitable for use later with the ATP process.

In addition to the precursor tape, a linear array of boron fibers is dispensed and fed through the aligning device and applied along the length of the precursor tape. This alignment facilitates the forming of the molten pre-preg or polymeric matrix into a precise shape and dimension. The precursor tape and applied boron fibers then proceed through the processing component. The processing component can comprise two parts, an oven or furnace and an impregnation or stationary bar assembly. The oven is heated to a specific processing temperature for each individual polymeric matrix depending on the solution-coated resin of the precursor tape. The oven further removes most of the solvent on the precursor tape to an amount of from about 2 wt % or less, or more preferably from about 1 wt % or less. Preferably, when processing requires a high temperature to melt the polymeric matrix material, an inert gas such as nitrogen is used as a process medium inside the oven to induce melting without oxidation. While still inside the oven, the precursor tape and boron fibers can be pulled through the impregnation bar assembly. The bars facilitate the wetting out of the filaments of the precursor tape, encapsulates the boron fibers into the precursor tape, and aid in the initial spreading of the precursor tape to a selected width and shape. The tension created from the pay-out creel is instrumental in this spreading process, with greater tension further assisting the spreading of the precursor tape.

Upon exiting the process component, the molten precursor tape can be fed through the variable dimension forming nip means. The variable dimension forming nip means cools the molten precursor tape with boron fibers and shapes them into an essentially precise, predetermined width. Preferably, the invention uses nitrogen as the cooling medium. Additionally, because the variable dimension forming nip means preferably do not have a defined gap between the two rollers, the rollers allow for changes in resin content along the precursor tape during processing by varying the cross-section along the length of the composite tape. Resin content can vary along the length of the precursor tape as much as about ±8%. Generally, the resin content ranges from about 50 wt % or less, preferably from about 25 wt % to about 40 wt %, and more preferably from about 30 wt % to about 35 wt %.

The next component is the driving means. The driving means pulls the precursor tape and boron fibers to fabricate the hybrid boron reinforced polymer matrix composition through the process. The driving means can maintain the speed of the process and remove any speed differential within the precursor tape. This constant speed in turn eliminates a shearing force which would facilitate gaps and splits in the finalized tape. Thus, the driving means allows the resin content to flow together. As a result, the method produces an essentially fully-consolidated hybrid boron reinforced polymer matrix composite, which is spooled by a motorized take-up system.

DESCRIPTION OF THE PREFERRED EMBODIMENTS

The present invention includes an apparatus and method of manufacturing a hybrid boron reinforced polymer matrix composite and an intermediate solution-coated precursor tape thereof Precursor tape is formed from polymer-coated tow bundles, with the formed precursor tape used to process the boron reinforced polymer matrix composite. The solution-coated precursor tape provides significant advantages in the deposition of resin onto the tow bundles, which decreases void areas within the processed hybrid boron reinforced polymer matrix composite. Fiber tow bundles used to fabricate the precursor tape have a filament array, with the fabricated precursor tape having a solution-coated polymeric matrix, with a solvent content of from about 25 wt % or less.

The boron component/fibers of the present invention are applied with an essentially even distribution along the length and across the width of the precursor tape. As such, a linear array of boron fibers is generally most applicable, with the linear array including boron fibers formed into a cohesive tape, mechanical applicators for the boron fibers, or other such application means for transferring boron fibers in a linear array along the length of the precursor tape. Boron fibers can include various forms of boron, including uniform and non-uniform shape, texture, size, etc. Amounts of the boron fibers incorporated into the boron reinforced polymer matrix composition may be varied according to design specifications and anticipated end use, particularly with regard to increase compressive properties, with the amount of boron fiber being determinable by those skilled in the art. Amounts of boron fibers preferably range from about 1 end per inch to about 200 ends per inch, more preferably from about 20 ends per inch to about 100 end per inch, and most preferably from about 25 ends per inch to about 50 ends per inch. A plurality of linear arrays of boron fibers may be used. The compressive properties found in the boron reinforced polymer matrix composition are particularly useful in applications requiring high compressive properties, such as landing gear applications. Other uses of the present invention are in any area which requires elevated temperature use with weight constraints and that are compression driven.

The present invention provides excellent wet out, proper fiber aerial weight, proper dispersion of boron fiber, good encapsulation of the boron fiber, proper resin content and dimensions and very little to no solvent content. These parameters facilitate the manufacture of composites from "dry" prepreg through automated tape placement.

Figure 1:
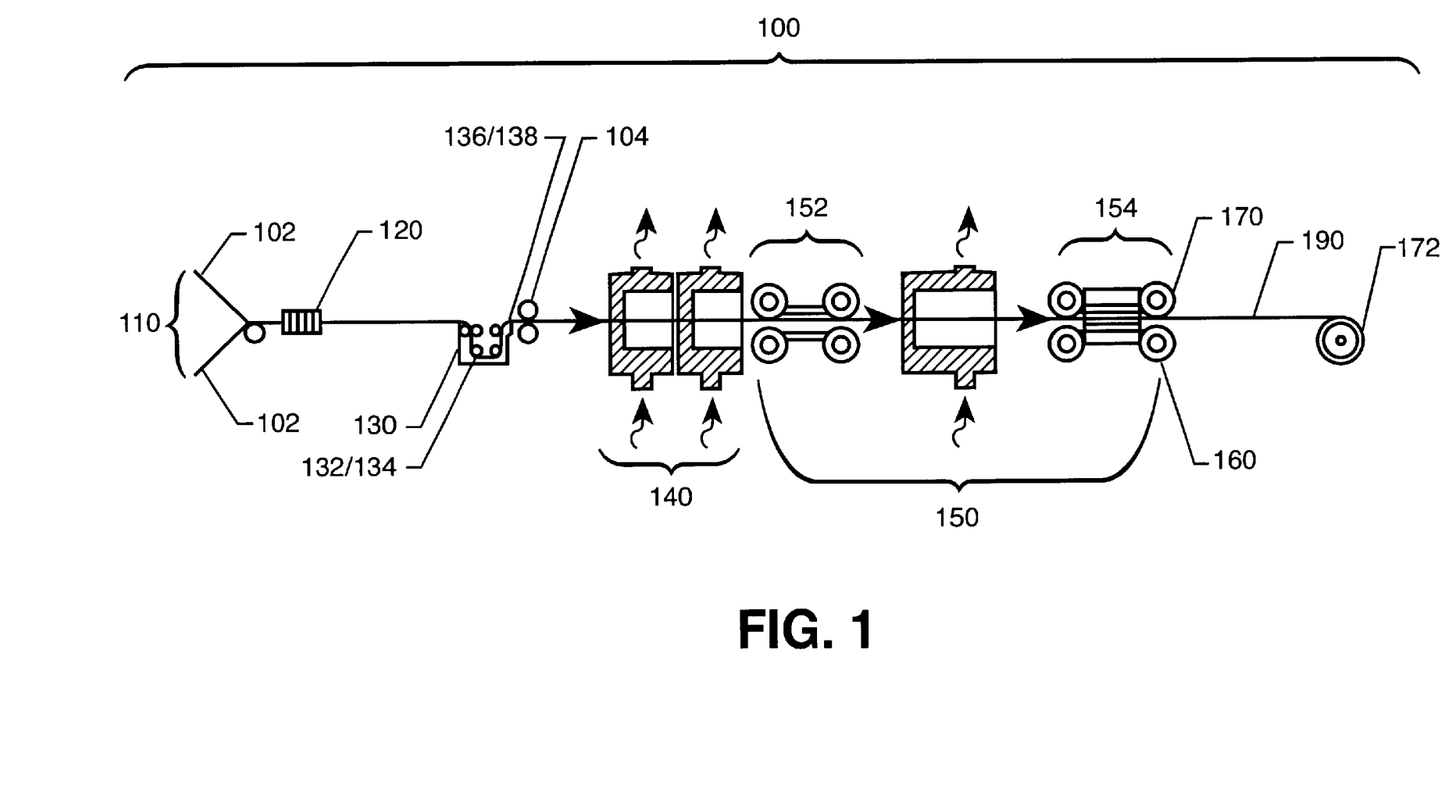
FIG. 1 is a side view of an apparatus for manufacturing a solution-coated precursor tape of the present invention.
Figure 2:
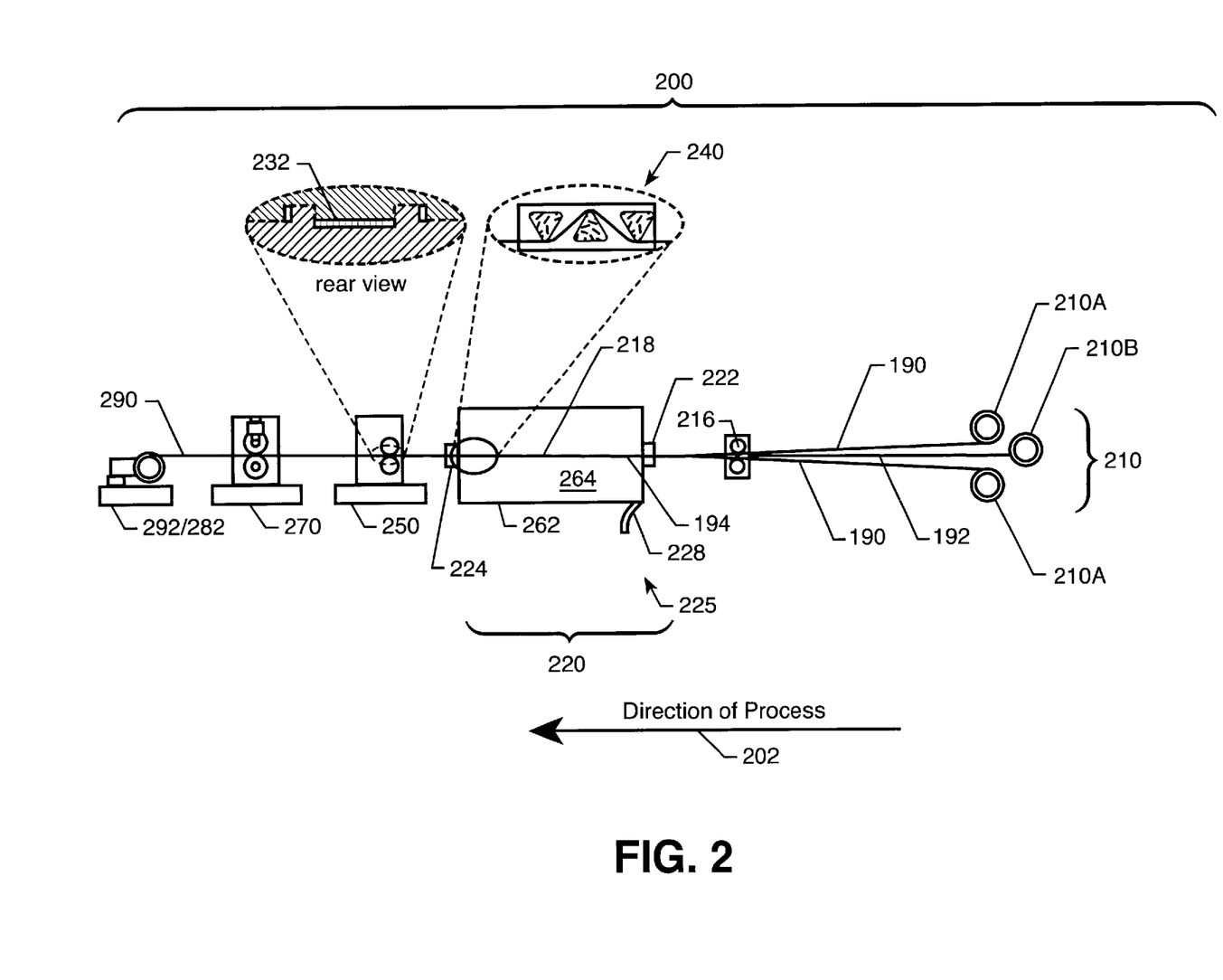
FIG. 2 is a side view of an apparatus for processing a solution-coated precursor tape and linear array of boron fibers into the boron reinforced polymer matrix composition of the present invention.

As seen in FIG. 1, the present invention includes the fabrication of a solution-coated precursor tape 190 from a plurality of fiber tow bundles 102 that are solution-coated in the apparatus 100. The present invention further includes a method and apparatus 200 for processing the solution-coated precursor tape 190 into a hybrid boron reinforced polymer matrix composite 290, as shown in FIG. 2.

FIG. 1 shows a side view of the apparatus 100 for manufacturing the solution-coated precursor tape 190 from a plurality of tow bundles 102 that become solution coated pre-impregnated fibers. Referring to FIG. 1, the apparatus includes a pay-out creel 110 for delivery of the plurality of tow bundles 102 to a collimation device 120. As the plurality of tow bundles 102 are fed from a fiber creel 110 to the collimation device 120, the plurality of tow bundles 102 become laterally aligned. The collimation device 120 is positioned in operable relationship to the pay-out creel 110 to facilitate the lateral alignment of the tow bundles 102.

Once collimated, the plurality of tow bundles 102 are dipped in a web dip tank 130. The dipping component 130 contains an impregnation bar assembly 132 that is positioned in operable relationship to the collimation device 120 to ensure an essentially even coating of the tow bundles 102 with the resin solution 134 contained therein. The impregnation bar assembly 132 applies or coats the resin solution 134 from within the web dip tank 130 onto the aligned tow bundles 102. Preferably the resin solution 134 within the web dip tank 130 comprises a polyamic acid solution. The polyamic acid solution may comprise a solid content of from about 25 wt % to about 40 wt %. As the resin solution 134 is applied onto the tow bundles 102, a resin matrix 138 remains on the tow bundles 102, forming solution-coated tow bundles 136. The solution-coated precursor tape 190 may comprise a resin content of from about 50 wt % or less, with preferred amounts of from about 25 wt % to about 40 wt %, and even more preferred amounts of from about 30 wt % to about 35 wt %.

After dipping, the dipped plurality of solution-coated tow bundles 136 are metered to obtain the appropriate amount of resin distributed thereon. A metering bar assembly 104 meters the dipped tow bundles 136 to ensure that the desired amount of resin matrix 138 is evenly distributed and has adhered to the solution-coated tow bundles 136.

A heating component 140 is used for drying excess solvent from the solution-coated tow bundles 136 to a solvent content of from about 15% or less. As the metered tow bundles are heated, excess solvent is devolatized from the solution-coated tow bundles 136 to an optimum amount.

The apparatus 100, as shown, further comprises a series of forming nips 150 that are positioned in operable relationship to the heating component 140 for shaping the heated solution-coated tow bundles 136. The heated solution-coated tow bundles 136 are shaped into pre-determined width suitable for further anticipated use of the precursor tape 190. This occurs by pulling the solution-coated tow bundles 136 through a series of nip rollers 152. Within the last set of forming nips 154, the apparatus 100 includes a cooling means 160 that sufficiently cools the solution-coated tow bundles 136 to become the precursor tape 190.

The apparatus 100 also includes a driving means 170 positioned for pulling the tow bundles 102/136 while being processed into the formed precursor tape 190 along the length of the apparatus 100. The apparatus 100 further includes a means for taking-up 172 the formed precursor tape 190. The means for take-up 172 allows the precursor tape 190 to be collected, preferably onto a spool.

The formed precursor tape 190 comprises an appropriate amount of solvent for a given use, preferably with a content of from about 25 wt % or less, that is more preferably within a range of from about 15 wt % or less, and most preferably from about 12 wt % or less. In amounts of from about 15 wt % or less, it becomes increasingly possibly to handle and work with the precursor tape 190 without the need for a covering/release tape or layer. Preferably, the precursor tape 190 comprises carbon fiber that has a polyamic acid solution coating thereon.

FIG. 2 shows a side view of an apparatus 200 for processing the solution-coated precursor tape 190, formed as shown in FIG. 1, with a linear array of boron fibers into the hybrid boron reinforced polymer matrix composite 290. The apparatus 200 comprises six major components: a dispensing means, such as a pay-out creel 210, an alignment device/applying means 216, a processing component 220, a variable-dimension forming nip means 250, a self-contained driving means 270, and a taking-up means 292. Each major component is positioned in operable relationship to its neighboring component. The direction of the process is shown by the vector 202. The apparatus 200 produces the hybrid boron reinforced polymer matrix composite 290 from the precursor tape 190 starting from the pay-out creel 210 for delivering the precursor tape 190 to the alignment device 216. After the solution-coated precursor tape 190 is mounted on two pay-out creels 210A, the precursor tape 190 is fed into the alignment device 216 within the apparatus 200. The alignment device 216 is positioned in an operable relationship to the pay-out creels 210A for aligning the precursor tape 190 laterally, allowing proper entry into the apparatus 220. Concurrently with the feeding of the precursor tape 190, a linear array of boron fibers 192 is fed from an additional pay-out creel 210B, through the alignment device 216, into the apparatus 220. Once the aligned precursor tapes 190 and linear array of boron fibers 192 enter the air rollers 216, the precursor tapes 190 and linear array of boron fibers 192 are applied together, where the linear array of boron fibers is applied to and between the two precursor tapes 190. Typically, the linear array of boron fibers 192 is sandwiched between the two precursor tapes 190 and pressed to maintain the linear array of boron fibers 192 in physical contact with the precursor tapes 190. After the linear array of boron fibers 192 have been applied to the two precursor tapes 190, the precursor tape with boron fibers 194 enters a heating stage or processing component 220 that heats the aligned precursor tape with boron fibers 194.

The processing component 220 is positioned in operable relationship to the alignment device 216 to maintain the precursor tape with boron fibers 194 with lateral alignment. The processing component 220 heats the precursor tape with boron fibers 194, preferably with an inert gas, to a specific processing temperature which processes the polymeric matrix of the precursor tape. Processing can include devolatization, reaction and melting of the polymeric matrix of the precursor tape component. The processing temperature is sufficiently high to process the polymeric matrix of the precursor tape component to form a pliable-heated precursor tape having dispersed boron fibers 218. The processing component 220 has an entrance 222 and an exit 224, with an impregnation bar assembly 240 housed in and positioned near the exit 224 of the processing component 220. The impregnation bar assembly 240 is used for wetting-out the fibers of the heated precursor tape having dispersed boron fibers 218, encapsulating the boron fibers into the precursor tape component, and for spreading the heated precursor tape with encapsulated boron fibers 218 to an initial width and shape. The impregnation bar assembly 240, as shown, is housed within a tube furnace or oven 262 which can have a steel tube liner. The oven 262 is heated to a specific processing temperature for each individual polymeric matrix depending on the solvent and resin of the precursor tape. Preferably, when processing requires a high temperature to melt the polymeric matrix material, an inert gas such as nitrogen, supplied by a gas line 228 as indicated in FIG. 2, is used as a process medium inside the oven 262 to induce melting without oxidation. Also preferably, the oven 262 comprises a three-zone furnace with a steel liner. However, any oven 262 which raises the temperature in the melting chamber 264 to the melting point of the polymetric matrix, which also removes solvents and allows chemical reaction to occur, if necessary, will suffice.

As shown, the melting chamber 264 is located within and is first encountered at the entrance 222 to the oven 262. Within the melting chamber 264, the polymeric matrix of the precursor tape 190 is processed from a resin solution precursor into a molten, essentially solvent free polymer. The continuous filament array component of the precursor tape 190 remains essentially solid and continues to support 100% of the pulling tension. When the resin matrix coated on the heated precursor tape having dispersed boron fibers 218 comprises a polyamic acid matrix, the processing component 220 heats the precursor tape having dispersed boron fibers 218 to a processing temperature which removes solvent and imidizes the polyamic acid resin matrix on the heated precursor tape having dispersed boron fibers 218. During the heating, the boron fibers become encapsulated and further dispersed within the precursor tape 218.

Figure 3A:
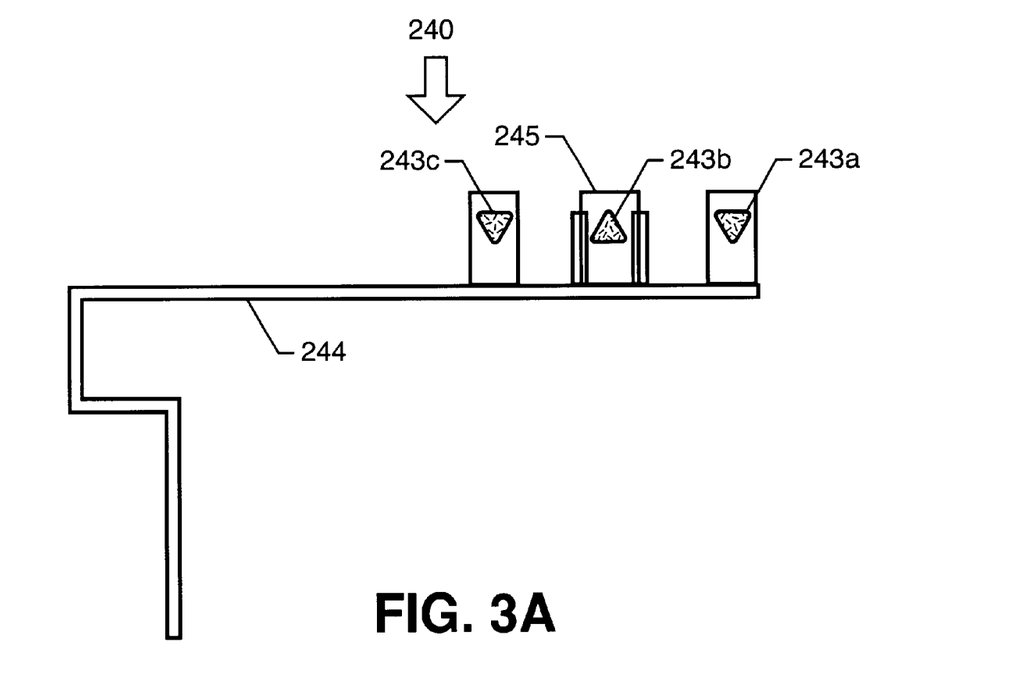
FIGS. 3A and 3B show a side view and top view, respectively, of the bar assembly of the present invention.
Figure 3B:
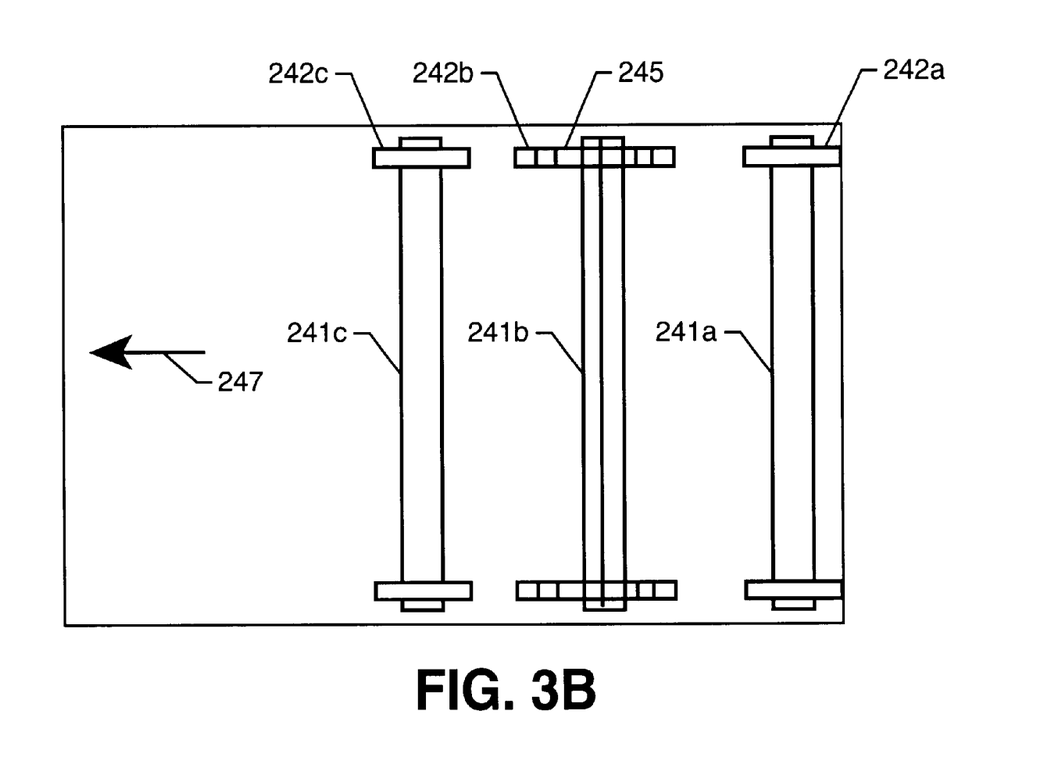

Near the exit 224 of the processing component 220 is the impregnation bar assembly 240. Referring now to FIGS. 3A and 3B, the impregnation bar assembly 240 comprises a bar fixture 244, a plurality of bar uprights 242a, 242b, 242c, and a plurality of stationary bars 241a, 241b, 241c fixed substantially perpendicular to the axial direction of the precursor tape, which is represented by the vector 247. Preferably, the number of stationary bars is three and the cross-sectional shape of each bar is substantially triangular. Each bar 241a, 241b, 241c is oriented sequentially in series to the direction 247 of the heated precursor tape having dispersed boron fibers 218. The heated precursor tape having dispersed boron fibers 218 is pulled through the impregnation bar assembly 240 in such a manner as that each bar contacts the heated precursor tape having dispersed boron fibers 218 at a cross-sectional apex 243a, 243b, 243c of each bar. Either sequential pathway of the precursor tape through the bars, under-over-under (shown), or over-under-over (not shown), will produce a good result. The impregnation bar assembly 240 may comprise any appropriate configuration for processing the heated precursor tape 218, preferably comprising an adjustable bar holder 245 which adjusts the height of the middle bar 241b relative to the other two bars 241a and 241c. The height of the middle bar 241b remains stationary during the course of the manufacturing process. Changing the height of the middle bar effectively changes the wrap angle of the impregnation bar assembly 240.

The bars may be constructed of materials which maintain structural integrity at temperatures above the processing temperature of the polymeric matrix of the prepreg material. Some examples of materials which may be used for the bars include: polished quartz, bulk carbon graphite, and ceramic such as partially stabilized zirconia (PSZ). The geometry of the bars and the bar uprights controls the resulting pressure gradients which are applied to the prepreg material by the impregnation bar assembly 240. The geometry can be adjusted to affect the pressure gradients. Examples of such adjustments and the effects include: 1) increasing the bar surface curvature radius decreases the applied pressure gradients; 2) increasing the center line distance between each contact radius center of each stationary bar decreases the applied pressure gradients; 3) increasing the wrap angle defined by the center line and the precursor tape increases the applied pressure gradients. The application of these pressure gradients allows for the expulsion of voids and the re-distribution of the polymeric matrix and the filaments, a process known in the art as wetting-out. This process causes the heated precursor tape having dispersed boron fibers 218 to begin forming into a consolidated, wide, flat shape, creating an initial width.

After the heated precursor tape having dispersed boron fibers 218 exits the impregnation bar assembly 240, the polymeric matrix of the prepreg material remains in a transition from a viscous liquid to a state described as a malleable plastic solid. On exit from the processing component 220, the heated precursor tape having dispersed boron fibers 218 then enters the variable-dimension forming nip means 250. As shown in FIG. 2, the variable-dimension forming nip means 250 is placed in an operable relationship to the processing component 220. This relationship allows enough distance from the processing component 220 for the polymeric matrix to remain molten upon entrance into the variable-dimension forming nip means. The variable dimension forming nip means 250 shapes the heated precursor tape having dispersed boron fibers 218 into a predetermined width 232 as the heated precursor tape having dispersed boron fibers 218 is pulled through the variable dimension forming nip means 250.

Figure 4:
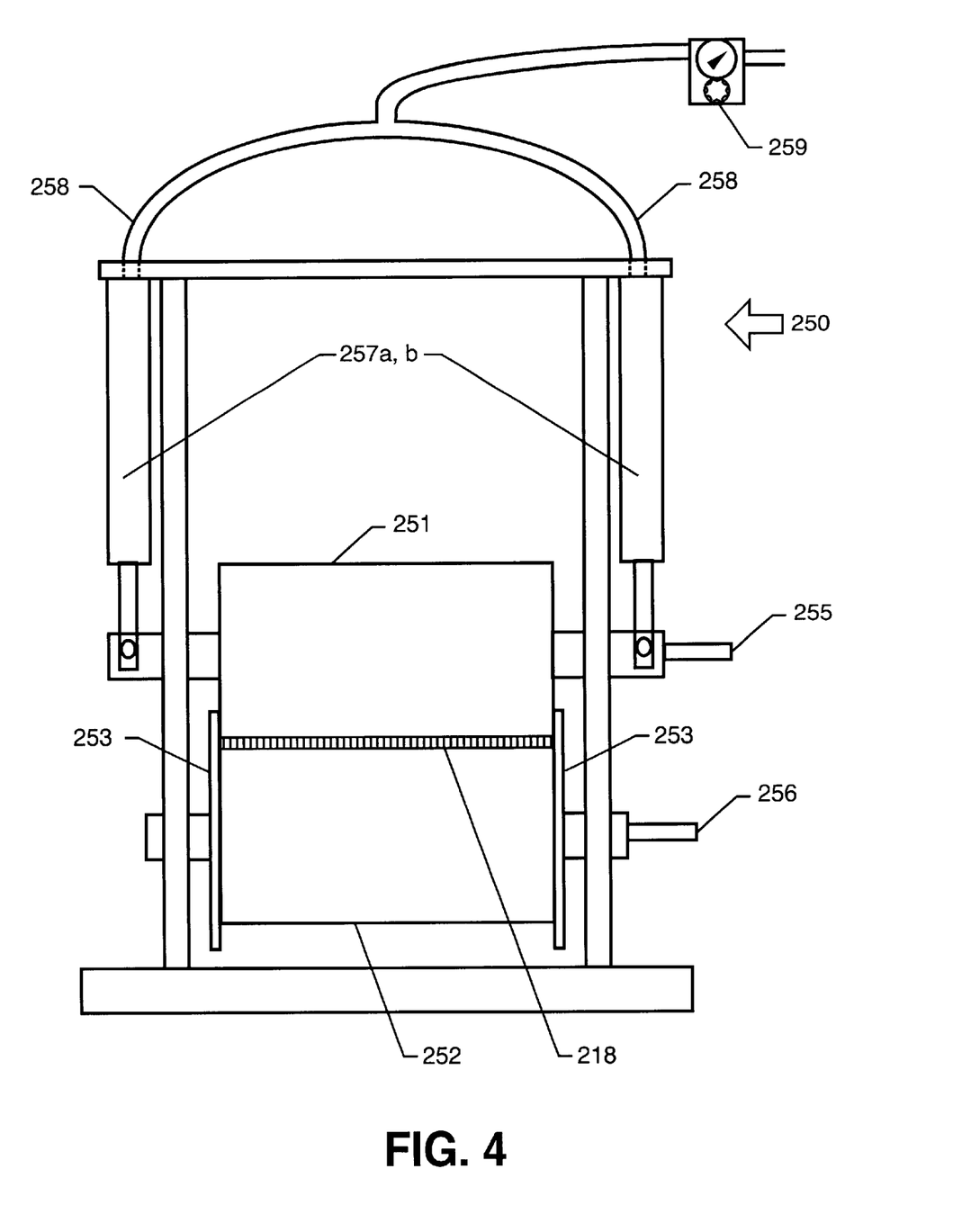
FIG. 4 is a front view of the variable-dimension shaping means of the present invention; and, FIG. 5 is a front view of the self-contained driving means of the present invention.

As shown in FIG. 4, the variable-dimension forming nip means 250 is a variably-loaded, surface-cooled nip-roller apparatus. The forming nip means comprises two nip-rollers 251, 252 whose surfaces are continuously or actively cooled under forced convection through load bearing shafts 255, 256 which are connected to a suitable cooling medium. Preferably, the cooling medium is nitrogen. A variable-loading means 257a, 257b variably loads the floating roller 251 against the fixed roller 252. Preferably, the variable loading means 257a, 257b is a pair of pneumatic air cylinders connected to an air line 258. A pressure regulator 259 selects and adjusts the consolidation pressure exerted by the rollers 251, 252 onto the heated precursor tape having dispersed boron fibers 218. Alternatively, other types of loads, such as a spring load, may also be employed. The variable loading allows for passing of anomalies, such as filament balls, in the heated precursor tape having dispersed boron fibers 218. More importantly, because the nip rollers 251, 252 do not have a defined gap between them, the rollers allow for changes in resin content along the precursor tape during processing by varying the cross-section along the length of the composite tape. Resin content can vary along the length of the precursor tape as much as about ±8%. Generally, the resin content ranges from about 50 wt % or less, preferably from about 25 wt % to about 40 wt %, and more preferably from about 30 wt % to about 35 wt %.

Under the load applied by the loaded nip-rollers 251, 252 and the thermal gradient imposed by the cool roller surfaces, the molten plastic is cooled to a temperature below the $T_g$ of the polymer matrix and undergoes transition to a solid elastic state, and the heated precursor tape having dispersed boron fibers 218 is shaped to a precise width as determined by the location of flanges 253, which connect to the ends of the fixed roller 252. An advantage to having the nip-rollers cool is that no release paper is required. The hot sticky polymer melt is quickly solidified (1/10 to 1/1000 second) on contact with the cool nip-rollers. The space between the flanges 253 which is used to form the final width of the consolidated composite tape may be dimensioned for a variety of widths. Spacing of three inches provides excellent results, although any width could be fabricated. The shaped precursor tape having dispersed boron fibers 218 is consolidated and its cross-section is essentially uniform along their length and width, wherein the cross-section of at least the substantial majority of the center of the width of the tape is uniform. As the heated precursor tape having dispersed boron fibers 218 is reshaped and cooled in the air-cooled nip rollers 250, the heated precursor tape having dispersed boron fibers 218 forms into the boron/carbon reinforced polymer matrix composite 290.

Figure 5:
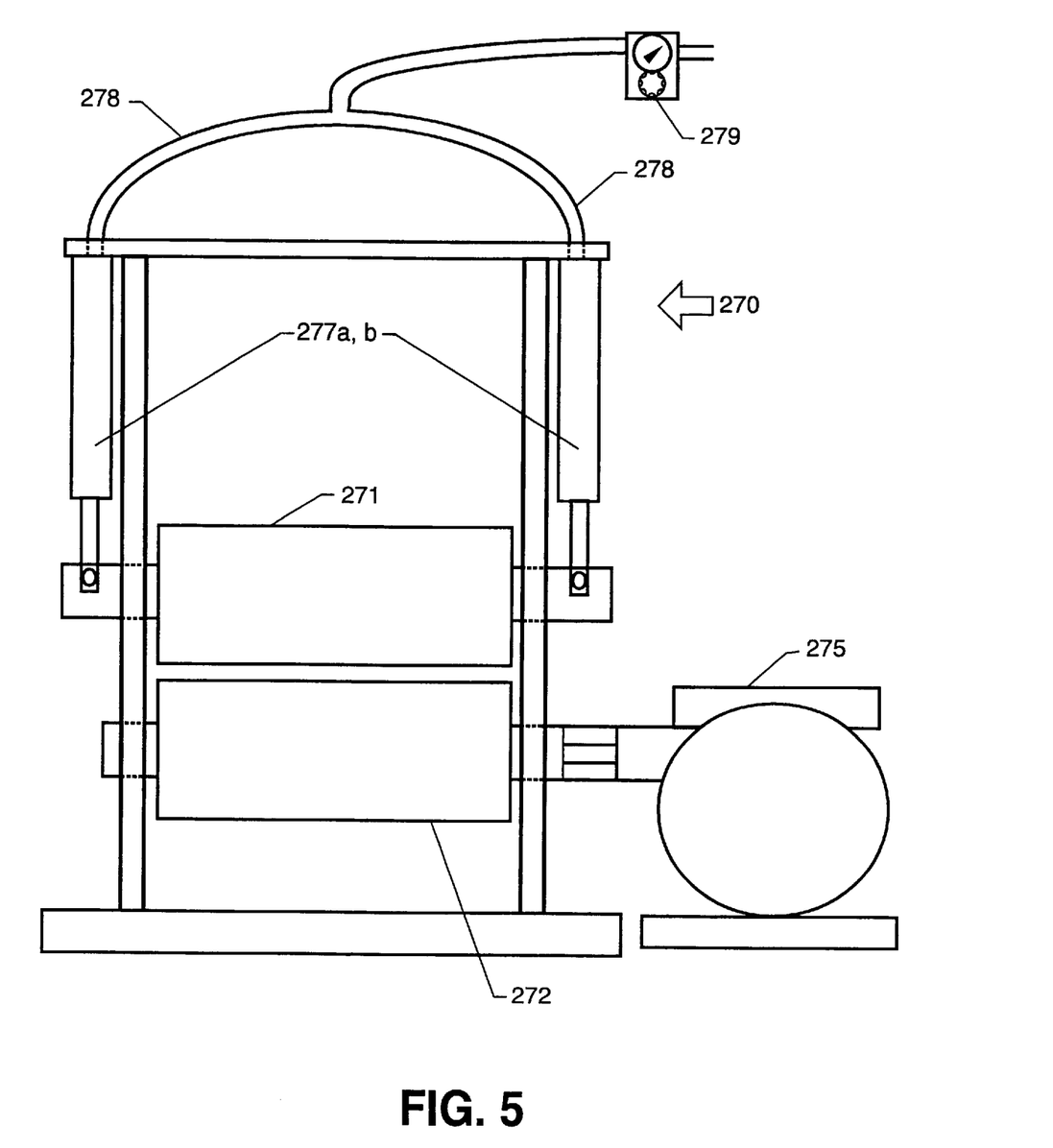

The driving means 270 is positioned in operable relationship to the variable-dimension forming nip means 250 and is used to pull the precursor tape having dispersed boron fibers 218. The driving means 270 maintains a constant speed across the width of the heated precursor tape having dispersed boron fibers 218 in order to allow the polymeric matrix of the heated precursor tape having dispersed boron fibers 218 to fully consolidate into the hybrid boron reinforced polymer matrix composite 290. Referring now to FIG. 5, the driving means 270 comprises a pair of opposing pull rollers 271, 272, an electric motor 275, and a pair of variable loading means 277a, 277b. The variable-loading means 277a, 277b variable loads the floating roller 271 against the fixed roller 272. Preferably, the variable loading means 277a, 277b is a pair of pneumatic air cylinders connected to an air line 278. A pressure regulator 279 selects and adjusts the consolidation pressure exerted by the rollers 271, 272 onto the hybrid boron reinforced polymer matrix composite 290. Alternatively, other types of loads, such as a spring load, may also be employed.

The driving means 270 pulls the precursor tape/boron through the process and also maintains a constant speed for the process by eliminating any speed differential cross-sectionally across the precursor tape having dispersed boron fibers 218 prior to take-up. Any differential in speed across the precursor tape will cause gaps and splits in the composition to occur. Thus, this constant speed further assists the molten polymeric matrix of the precursor tape having dispersed boron fibers 218 to flow together better over greater widths than processes given by the prior art. Preferably, the driving means 270 is self-contained within the apparatus 200. The cross-sectional area of the hybrid boron reinforced polymer matrix composite 290 is generally controlled to a suitable width, such as from about 1¼ inch to about 4 inches. The hybrid boron reinforced polymer matrix composite 290 is useful in automated tape placement machines, and possesses substantial compressive properties, particularly when compared to non-boron containing compositions.

As shown in FIG. 2, the process finishes with a hybrid boron reinforced polymer matrix composite 290, which is spooled by the motorized taking-up means 292. A take-up component 282 is used for taking-up the hybrid boron reinforced polymer matrix composite 290. With the formation of the hybrid boron reinforced polymer matrix composite 290, a level-wind take-up device 292 is used to collect the hybrid boron reinforced polymer matrix composite 290.

As may be understood by those skilled in the art, the apparatus for manufacturing a solution-coated precursor tape of the present invention, shown in FIG. 1 and the apparatus for processing a solution-coated precursor tape into the hybrid boron reinforced polymer matrix composite 290, shown in FIG. 2, may be incorporated into a singular apparatus for convenience of manufacture. Other variations of the arrangement of the present invention also are possible, such as processing multiple lines of the precursor tape, changing the temperature of the web dip tank, etc., with these variations determinable by those skilled in the art. Additional reinforcing fibers/agents may be used to impart additional strength or other characteristics into the hybrid boron reinforced polymer matrix composite 290. Exemplary reinforcing fibers include glass, kevlar, carbon, and mixtures thereof, with carbon fibers preferred.

With the present invention, the voids that result as a consequence of the precursor quality and type of manufacturing technique are minimized. Voids within the hybrid boron reinforced polymer matrix composition 290 range from about 2% by volume or less, with preferable ranges of from about 1% by volume or less. The hybrid boron reinforced polymer matrix composite 290 manufactured by the present invention may comprise any suitable dimensions, generally tailored to specific uses. For example, the precursor tape 190 can include dimensions preferably including a width of from about 3⅛ inches to about 3¼₁₄ inches, and an about 3 inch hybrid boron reinforced polymer matrix composite 290 can be manufactured within a given tolerance specification.

The process of this invention may be used to manufacture hybrid boron reinforced polymer matrix composition from various precursors, including the thermoplastics LaRC™IAX and LaRC™8515 and the lightly cross-linking thermoplastic, LaRC™PETI-5. Other materials that are able to be processed on the line include almost all thermoplastics and thermosets, including epoxies and bismaleimides.

EXAMPLE 1

IM7/IAX solution-coated precursor tape was creelled as illustrated in FIG. 2.

The solution-coated precursor had a nominal resin content of approximately 36 wt %. A precursor tape with solution-coated prepreg encapsulating a collimated boron array of 100 ends/inch was aligned and was run into a furnace over a set of stationary bars. The bars were set at 400° C. and allowed to equalize for one hour. The furnace zones were set to provide enough heat to devolitalize, imidized and melt the polymer prior to traversing the bars, and to heat the bars themselves to allow flow and spreading of the tows as they went over and under the bars. The forming die roller was nitrogen cooled to quench the hybrid tape to a specified shape. The line speed was controlled a with the pull rollers to allow adequate time at temperature for the required polymer flow to occur, which was 15 ft/min. The precursor tape was fabricated to a attain a desired carbon fiber aerial weight (FAW) and boron FAW. A hybrid tape of controlled cross-sectional area was then taken-up on the product take-up.

EXAMPLE 2

IM7/IAX solution-coated precursor tape are creelled as illustrated in FIG. 2. The solution-coated precursor has a nominal resin content of approximately 36 wt %. A precursor tape with twenty-six ends is aligned and run into a furnace over a set of stationary bars. Another precursor tape with twenty-six ends is run through the furnace over another set of stationary bars located slightly below the first set. Both sets of bars are set at 400° C. and allowed to equalize for one hour. Collimated boron ends are then run through the furnace between both sets of bars and precursor tapes, becoming encapsulated at the forming nips. The furnace zones are set to provide enough heat to devolitalize, imidized and melt the polymer prior to traversing the bars, and to heat the bars themselves to allow flow and spreading of the precursor tapes as they go over and under the bars. The forming die roller is nitrogen cooled to quench the hybrid tape to a specified shape. The line speed is controlled with the pull rollers to allow adequate time at temperature for the required polymer flow to occur, which is 15 ft/min. The precursor tapes are fabricated to a attain a desired carbon fiber aerial weight (FAW) and boron FAW. A hybrid tape of controlled cross-sectional area is then taken-up on the product take-up.

The foregoing summary, description, examples and drawings of the present invention are not intended to be limiting, but are only exemplary of the inventive features which are defined in the claims.

We claim:

1. A method of manufacturing a hybrid boron reinforced polymer matrix composite, comprising the steps of:
    (a) feeding solution-coated precursor tape through an alignment device to align the precursor tape laterally, wherein the solution-coated precursor tape comprise a resin content of from about 50 wt % or less;
    (b) applying at least one linear array of boron fibers along the length of the solution-coated precursor tape;
    (c) heating the precursor tape and applied boron fibers to a specific processing temperature which melts the polymeric matrix of the heated precursor tape;
    (d) encapsulating the boron fibers between two layers of heated precursor tape forming a hybrid boron reinforced polymer matrix composition;
    (e) cooling the hybrid boron reinforced polymer matrix composition to a temperature below the $T_g$ of the hybrid boron reinforced polymer matrix composition forming a composite; and,
    (f) taking-up the hybrid boron reinforced polymer matrix composition composite.

2. The method of claim 1, wherein the precursor tape and linear array of boron fibers pass through air rollers.

3. The method of claim 1, wherein the solution-coated precursor tape comprises carbon fiber.

4. The method of claim 1, wherein the solution-coated precursor tape comprises a polyamic acid solution.

5. The method of claim 1, wherein the solution-coated precursor tape comprises a resin content of from about 25 wt % to about 40 wt %.

6. The method of claim 1, wherein the step of applying at least one linear array of boron fibers comprises applying a plurality of linear arrays of boron fibers.

7. The method of claim 6, wherein the plurality of linear arrays of boron fibers are fed to an alignment device to align the plurality of linear arrays of boron fibers laterally.

8. The method of claim 1, wherein the step of heating the precursor tape and applied boron fibers comprises passing the heated tow bundles and applied boron fibers across at least one impregnation bar.

* * * * *